United States Patent
Kubota

(10) Patent No.: US 11,019,314 B2
(45) Date of Patent: May 25, 2021

(54) PROJECTOR AND METHOD FOR CONTROLLING PROJECTOR

(71) Applicant: SEIKO EPSON CORPORATION, Tokyo (JP)

(72) Inventor: Shinji Kubota, Ina (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/792,933

(22) Filed: Feb. 18, 2020

(65) Prior Publication Data

US 2020/0267356 A1 Aug. 20, 2020

(30) Foreign Application Priority Data

Feb. 19, 2019 (JP) .............................. JP2019-027037

(51) Int. Cl.
*H04N 9/31* (2006.01)
*G03B 17/54* (2021.01)

(52) U.S. Cl.
CPC ........... *H04N 9/317* (2013.01); *H04N 9/3194* (2013.01); *G03B 17/54* (2013.01)

(58) Field of Classification Search
CPC .............. G03B 21/00–64; G03B 17/14; G03B 17/00–58; G02B 7/102; G02B 7/14; G02B 7/16; H04N 9/00–898
See application file for complete search history.

(56) References Cited

U.S. PATENT DOCUMENTS

| | | | |
|---|---|---|---|
| 2008/0136941 A1* | 6/2008 | Kato | G02B 7/102 348/231.99 |
| 2018/0268784 A1* | 9/2018 | Chapman, III | G09G 3/001 |

FOREIGN PATENT DOCUMENTS

| | | |
|---|---|---|
| JP | 2004-333736 A | 11/2004 |
| JP | 2015-018018 A | 1/2015 |
| JP | 2015-144344 A | 8/2015 |

* cited by examiner

*Primary Examiner* — Christina A Riddle
*Assistant Examiner* — Christopher A Lamb, II
(74) *Attorney, Agent, or Firm* — Dority & Manning, P.A.

(57) ABSTRACT

A projector moves a first imaging lens and a second imaging lens in a direction that intersects the optical axis of an imaging section to adjust the imaging range of the imaging section and moves the first imaging lens and the second imaging lens in the direction that intersects the optical axis of the imaging section to switch the imaging lens located in a position corresponding to the imaging section from one to another.

15 Claims, 13 Drawing Sheets

PROJECTOR AND METHOD FOR CONTROLLING PROJECTOR

The present application is based on, and claims priority from JP Application Serial Number 2019-027037, filed Feb. 19, 2019, the disclosure of which is hereby incorporated by reference herein in its entirety.

BACKGROUND

1. Technical Field

The present disclosure relates to a projector and a method for controlling the projector.

2. Related Art

There has been a known projector that includes an imaging section and causes the imaging section to capture an image of a projection surface to perform a variety of types of adjustment.

For example, JP-A-2015-144344 discloses a projection assisting apparatus that includes an imaging section that captures an image and an acquisition section for acquiring the image captured by the imaging section as projection target information and identifies a projection surface candidate, on which an image is projected, based on the projection target information acquired by the acquisition section.

In a case where the image captured by the imaging section does not satisfy a predetermined condition, however, it is undesirably necessary to switch the imaging lens to another and adjust the imaging range of the switched imaging lens.

SUMMARY

An aspect of the present disclosure is directed to a projector including a projection section that projects image light, a first imaging lens, a second imaging lens, an imaging section that captures an image of a displayed image formed of the projected image light via the first imaging lens or the second lens, and an imaging lens moving mechanism that moves the first imaging lens and the second imaging lens in a direction that intersects optical axes of the imaging lenses, and the imaging lens moving mechanism performs a lens switch action of switching the first imaging lens or the second imaging lens used by the imaging section to perform the imaging from one to another and a lens shift action of shifting the first imaging lens or the second imaging lens in a position corresponding to the imaging section.

In the projector described above, the imaging lens moving mechanism may move the first imaging lens or the second imaging lens to the position that corresponds to the imaging section and a position that does not correspond to the imaging section.

In the projector described above, the imaging lens moving mechanism may move the first imaging lens and the second imaging lens along a plane that intersects the optical axes of the imaging lenses.

In the projector described above, the imaging lens moving mechanism may include a support that supports the first imaging lens and the second imaging lens and a moving mechanism that moves the support, and the moving mechanism may move the support in the lens switch action to move the first imaging lens or the second imaging lens to an optical axis of the imaging section.

In the projector described above, at least one of the first imaging lens and the second imaging lens may be so disposed as to face in a direction in which the image light is projected.

In the projector described above, attaching a projection direction changing system may allow the projection section to change a direction in which the image light is projected, and the imaging lens moving mechanism may include an imaging lens unit that faces in a direction in which the image light traveling in the direction changed by the projection direction changing system is projected.

In the projector described above, the projection section may include a projection lens and a projection lens moving mechanism that moves the projection lens in a direction that intersects an optical axis of the projection section, and the imaging lens moving mechanism may be capable of performing the lens shift action of shifting the first imaging lens or the second imaging lens in correspondence with an amount of movement over which the projection lens moving mechanism moves the projection lens.

Another aspect of the present disclosure is directed to a method for controlling a projector, the method including moving a first imaging lens and the second imaging lens in a direction that intersects an optical axis of an imaging section that captures an image of a displayed image to adjust an imaging range of the imaging section and moving the first imaging lens and the second imaging lens in the direction that intersects the optical axis of the imaging section to switch the first imaging lens or the second imaging lens located in a position corresponding to the imaging section from one to another.

The method for controlling a projector described above may further include moving a projection lens in a direction that intersects an optical axis of a projection section that projects the displayed image to adjust a direction in which image light is projected, acquiring an amount of movement of the projection lens, and moving the first imaging lens or the second imaging lens in correspondence with the amount of movement of the projection lens.

The method for controlling a projector described above may further include causing an imaging lens moving mechanism to perform a lens switch action of moving the first imaging lens and the second imaging lens to switch the first imaging lens or the second imaging lens located in a position corresponding to the imaging section from one to another and a lens shift action of shifting the first imaging lens or the second imaging lens in the position corresponding to the imaging section.

DESCRIPTION OF EXEMPLARY EMBODIMENTS

First Embodiment

Figure 1:
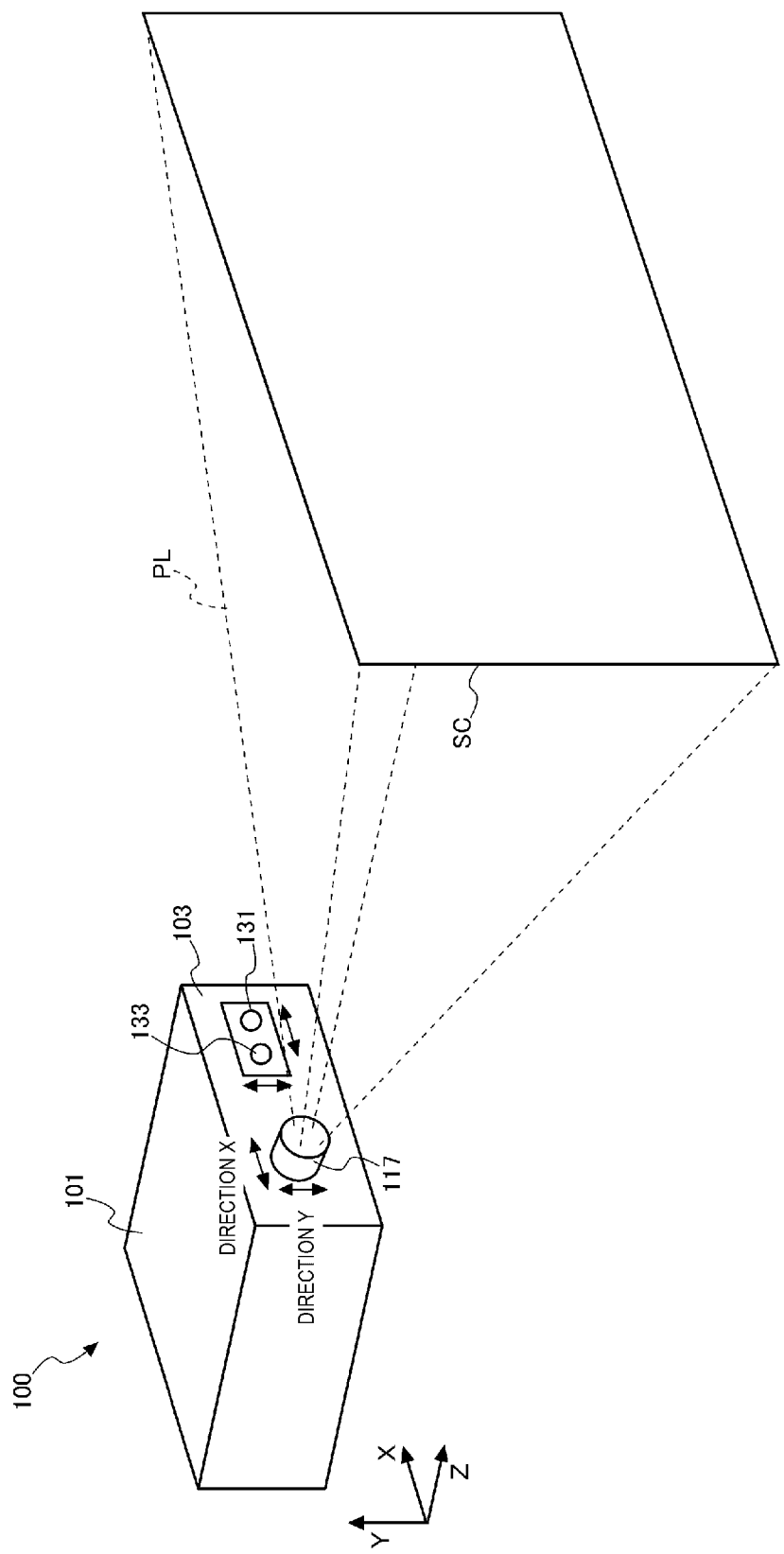
FIG. 1 shows the state in which a projector according to a first embodiment is used.

FIG. 1 shows the state in which a projector 100 according to a first embodiment is used. The following description will be made under the assumption that an enclosure 101, which accommodates the main body of the projector 100, has a box-like shape. The following description will be made under another assumption that the horizontal direction of the enclosure 101 is a direction X, the vertical direction of the enclosure 101 is a direction Y, and the direction of a normal to a front surface 103 of the enclosure 101 is a direction Z.

The projector 100 produces image light PL and projects the produced image light PL toward a screen SC. An image based on the image light PL is formed on the screen SC. The image based on the image light PL is thus displayed on the screen SC. The image based on the image light PL is called a projection image.

FIG. 1 shows a state in which the projector 100 is installed in the form of horizontal installation in which the projector 100 is horizontally installed, for example, on a table, a stand, or a floor. The projector 100 can instead be installed in the form of wall-mounted installation in which the projector 100 is fixed to a wall surface above or obliquely above the screen SC or in the form of ceiling-hung installation in which the projector 100 is hung from a ceiling.

The screen SC is a projection surface on which the projector 100 projects the image light PL and is a flat plate or curtain fixed to a wall or standing on a floor surface. The projection surface is not limited to the screen SC and can, for example, be a ceiling, a floor surface, or a wall surface.

A projection lens 117 of a projection section 110 and a first imaging lens 131 or a second imaging lens 133 of an imaging section 130 are exposed via the front surface 103 of the enclosure 101, which accommodates the main body of the projector 100. The first imaging lens 131 and the second imaging lens 133 are so provided as to face in a projection direction in which the projection lens 117 projects the image light PL. The projection section 110 projects the image light PL toward the projection surface to display an image. The imaging section 130 captures an image of the displayed image.

The projection section 110 includes a projection lens moving mechanism 119, which moves the projection lens 117. The imaging section 130 includes an imaging lens moving mechanism 137, which moves the first imaging lens 131 and the second imaging lens 133.

The projection lens moving mechanism 119 performs a projection lens shift action of moving the lens position of the projection lens 117.

The projection lens shift action is the action of moving the projection lens 117 in the directions X and Y perpendicular to the optical axis of the projection lens 117 to shift the position of the center of the projection lens 117. Shifting the position of the center of the projection lens 117 allows a shift of the position of the projection image projected on the screen SC. The directions X and Y correspond to an example of "a direction that intersects an optical axis of the projection section."

The imaging lens moving mechanism 137 performs an imaging lens switch action and an imaging lens shift action by moving the first imaging lens 131 and the second imaging lens 133 along a plane that intersects the optical axis of the imaging lens located in an imaging position. The imaging position is the position where collected light is incident on an imaging device 135.

The imaging lens switch action is the action of switching the imaging lens used to perform imaging to the first imaging lens 131 or the second imaging lens 133. The imaging lens moving mechanism 137 moves the first imaging lens 131 and the second imaging lens 133 to switch the imaging lens located in the imaging position to the other. The imaging lens switch action changes the range over which the light is incident on the imaging device 135 to enlarge or reduce an imaging range IA, which is the range over which the imaging section 130 performs imaging. The imaging position corresponds to "a position corresponding to the imaging section." The positions other than the imaging position, that is, the positions where no collected light is incident on the imaging device 135 each correspond to "a position that does not correspond to the imaging section." The optical axis of the first imaging lens 131 or the second imaging lens 133 located in the imaging position corresponds to an example of "an optical axis of the imaging section."

The imaging lens shift action is the action of shifting the first imaging lens 131 or the second imaging lens 133 located in the imaging position from the imaging position to another. Specifically, the imaging lens shift action is the action of moving the first imaging lens 131 or the second imaging lens 133 selected by the imaging lens switch action in the directions X and Y perpendicular to the optical axis of the first imaging lens 131 or the second imaging lens 133. The plane formed by two edges parallel to the directions X and Y corresponds to "a plane that intersects the optical axis of the imaging lens." In the present embodiment, the first imaging lens 131 and the second imaging lens 133 are simultaneously shifted by the imaging lens shift action, as will be described later. The imaging lens shift action changes the range over which the light is incident on the imaging device 135 to change the imaging range IA, which is the range over which the imaging section 130 performs imaging.

Figure 2:
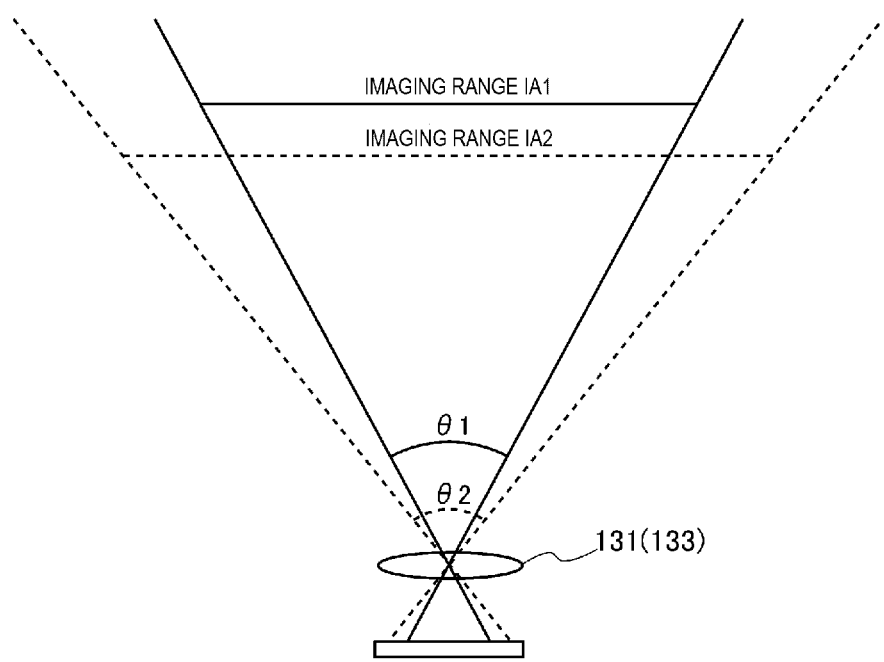
FIG. 2 shows angles of view of first and second imaging lenses.

FIG. 2 shows an angle of view θ1 of the first imaging lens 131 and an angle of view θ2 of the second imaging lens 133. The angle of view θ2 of the second imaging lens 133 indicated by the broken line in FIG. 2 is greater than the angle of view θ1 of the first imaging lens 131 indicated by the solid line in FIG. 2. The imaging lens switch action can therefore increase the size of the imaging range IA by switching the imaging lens located in the imaging position from the first imaging lens 131 to the second imaging lens 133. The imaging range IA of the first imaging lens 131 is called an imaging range IA1, and the imaging range IA of the second imaging lens 133 is called an imaging range IA2. The imaging range IA2 of the second imaging lens 133 is greater than the imaging range IA1 of the first imaging lens 131, as shown in FIG. 2.

Figure 3:
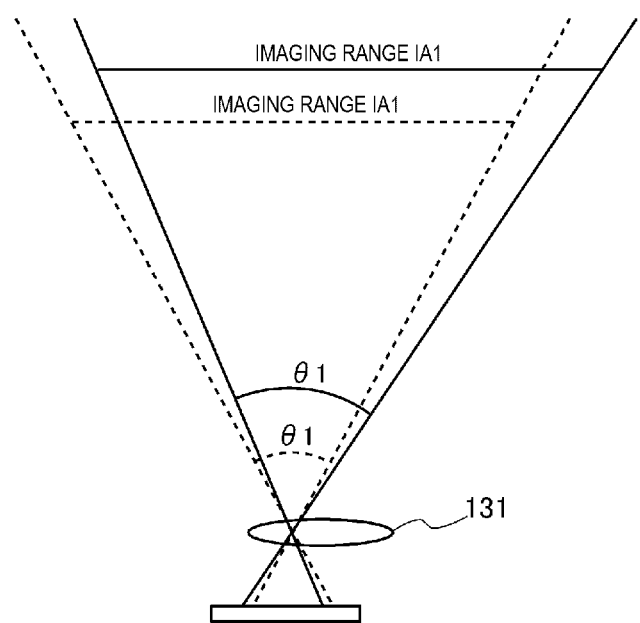
FIG. 3 shows the states before and after the first imaging lens is shifted.

FIG. 3 shows the states before and after the first imaging lens 131 located in the imaging position is shifted by the imaging lens shift action. The range indicated by the broken line in FIG. 3 is the imaging range IA1 before the shift, and the range indicated by the solid line in FIG. 3 is the imaging range IA1 after the shift. The imaging lens shift action changes the range over which the light is incident on the imaging device 135 to change the imaging range IA1, which is the range over which the imaging section 130 performs imaging.

Figure 4:
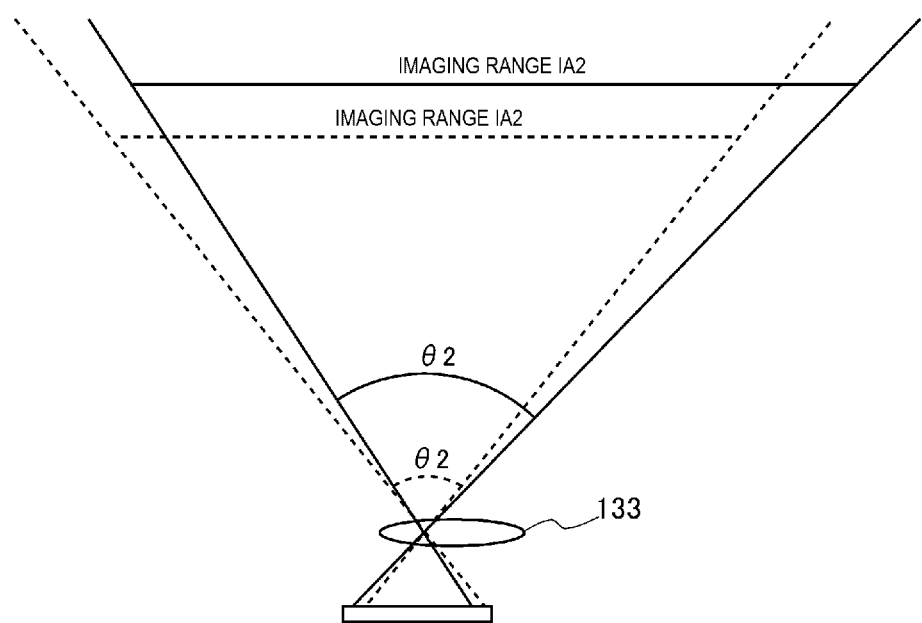
FIG. 4 shows the states before and after the second imaging lens is shifted.

FIG. 4 shows the states before and after the second imaging lens 133 located in the imaging position is shifted by the imaging lens shift action. The range indicated by the broken line in FIG. 4 is the imaging range IA2 before the shift, and the range indicated by the solid line in FIG. 4 is the imaging range IA2 after the shift. The imaging lens shift action changes the range over which the light is incident on the imaging device 135 to change the imaging range IA2, which is the range over which the imaging section 130 performs imaging.

Figure 5:
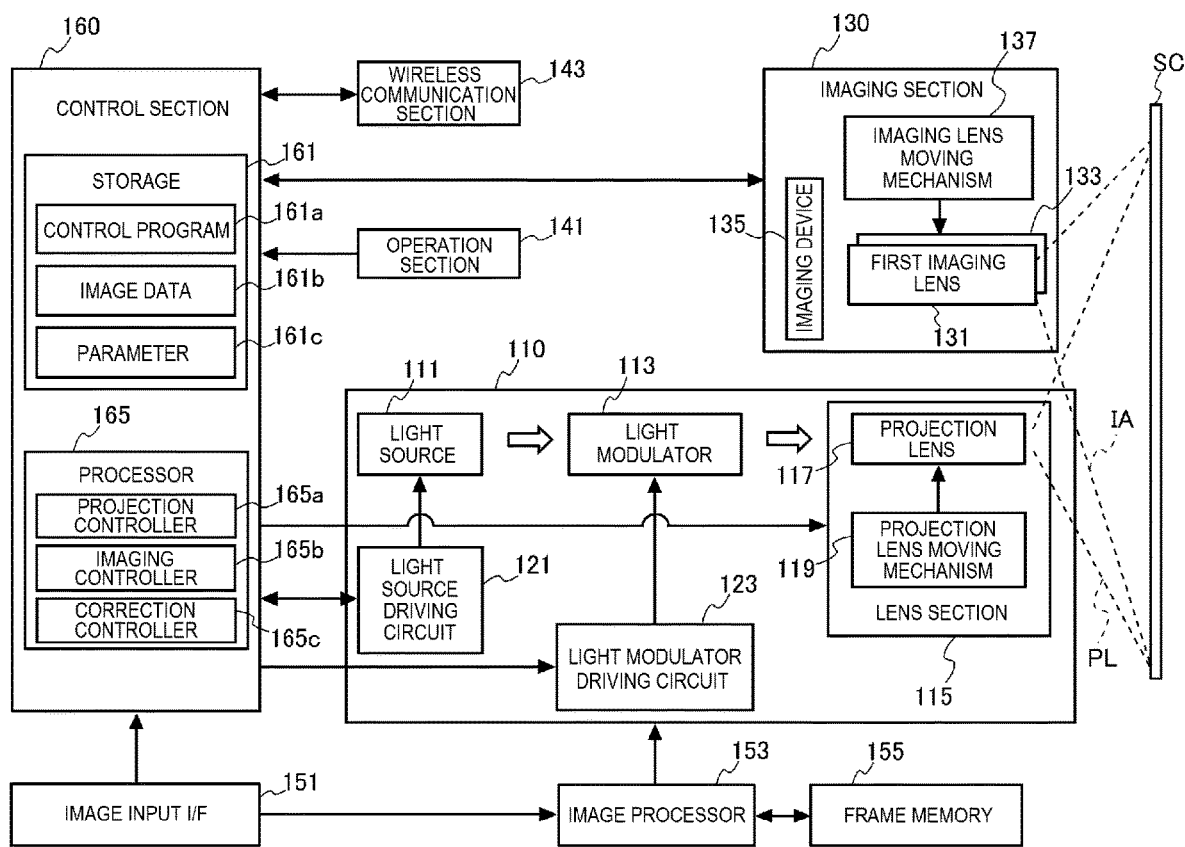
FIG. 5 shows the configuration of the projector.

FIG. 5 shows the configuration of the projector 100.

The configuration of the projector 100 will be described with reference to FIG. 5.

The projector 100 includes the projection section 110. The projection section 110 includes a light source 111, a light modulator 113, a lens section 115, a light source driving circuit 121, and a light modulator driving circuit 123.

The light source 111 is formed of a solid-state light source, such as an LED and a laser light source. The light source 111 may instead be a lamp, such as a halogen lamp, a xenon lamp, and an ultrahigh-pressure mercury lamp. The light source 111 emits light when driven by the light source driving circuit 121. The light source driving circuit 121 supplies the light source 111 with electric power to cause the light source 111 to emit light under the control of a control section 160.

The light modulator 113 includes a light modulating device, and the light modulating device modulates the light outputted from the light source 111 to produce the image light PL. The light modulating device may, for example, be a transmissive liquid crystal light valve, a reflective liquid crystal light valve, or a digital mirror device. The present embodiment will be described with reference to a case where the light modulating device is a transmissive light modulating device. The light modulator 113 outputs the produced image light PL to the lens section 115.

The light modulator 113 is coupled to the light modulator driving circuit 123. Image data processed by an image processor 153, which will be described later, is inputted to the light modulator driving circuit 123. The light modulator driving circuit 123 produces a drive signal that drives the light modulating device based on the inputted image data. The light modulator driving circuit 123 drives the light modulating device of the light modulator 113 based on the produced drive signal to adjust the transmittance at which the light modulating device transmits light to transmittance corresponding to the inputted image data.

The lens section 115 includes the projection lens 117 and projects the image light PL produced by the light modulator 113 on the screen SC. The lens section 115 further includes the projection lens moving mechanism 119 described above and performs the projection lens shift action, which shifts the lens position of the projection lens 117. The position of the projection image displayed on the screen SC is thus changed.

The projector 100 includes the imaging section 130.

The imaging section 130 includes the first imaging lens 131, the second imaging lens 132, and the imaging device 135.

The first imaging lens 131 and the second imaging lens 133 have different lens characteristics. The second imaging lens 133 is formed of a wide-angle lens having an angle of view wider than that of the first imaging lens 131. The imaging device 135 is an image sensor, such as a CMOS device and a CCD. The imaging device 135 is used as a device common to the first imaging lens 131 and the second imaging lens 133. That is, the two imaging lenses, the first imaging lens 131 and the second imaging lens 133, are provided with the one imaging device 135. The imaging section 130 includes a data processing circuit that produces imaging data from the light received by the imaging device 135. The data processing circuit is not shown.

The imaging section 130 performs imaging to produce the imaging data under the control of the control section 160 and outputs the produced imaging data to the control section 160. The imaging data is used, for example, to adjust color unevenness of the projection image.

Figure 6:
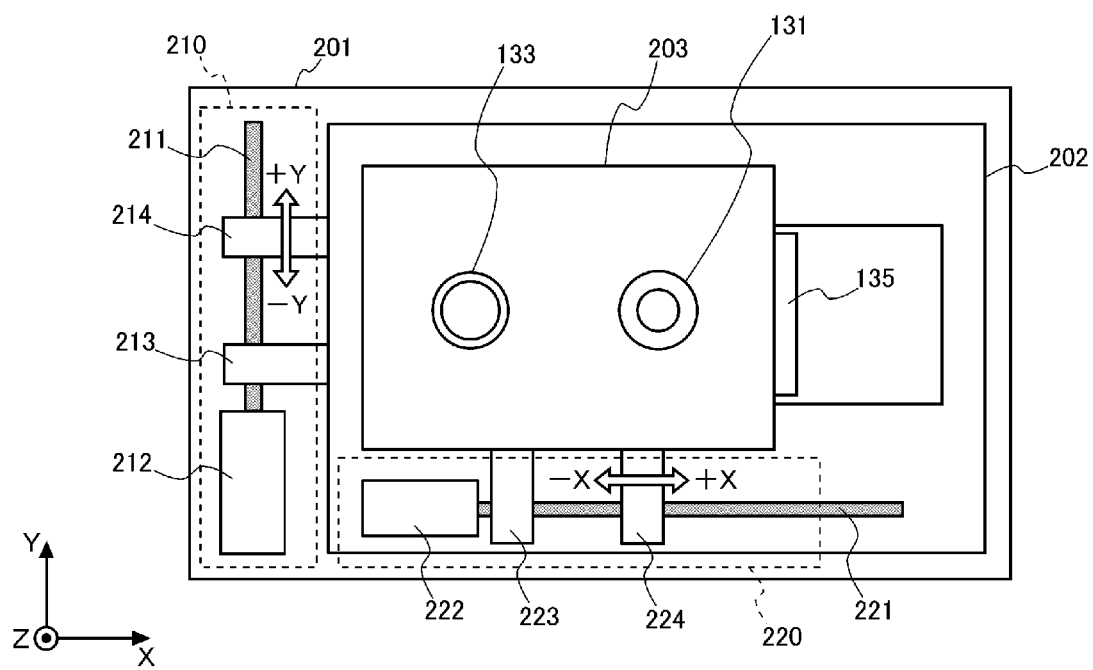
FIG. 6 shows the configuration of an imaging section.
Figure 7:
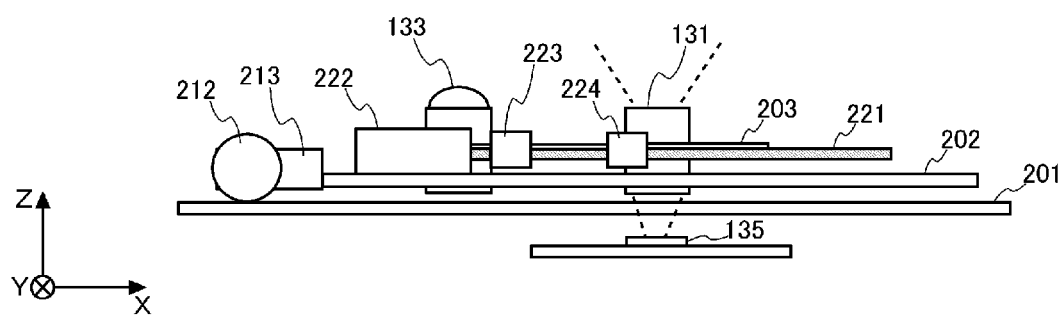
FIG. 7 shows the configuration of the imaging section.
Figure 8:
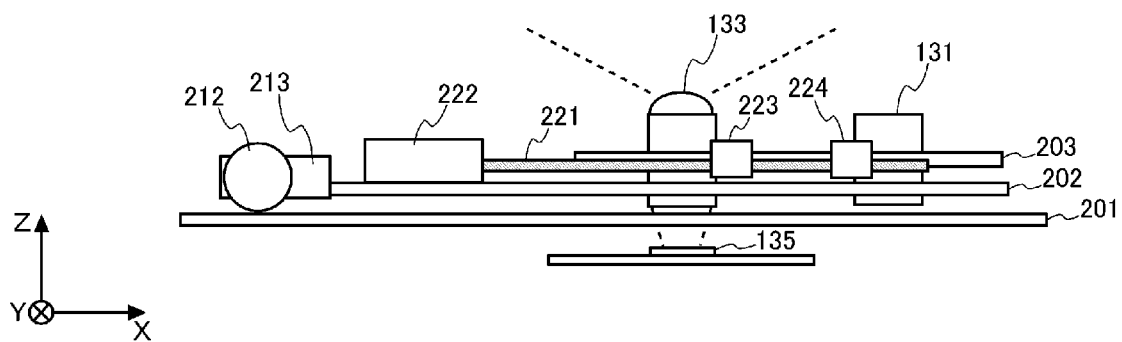
FIG. 8 shows the configuration of the imaging section.
Figure 9:
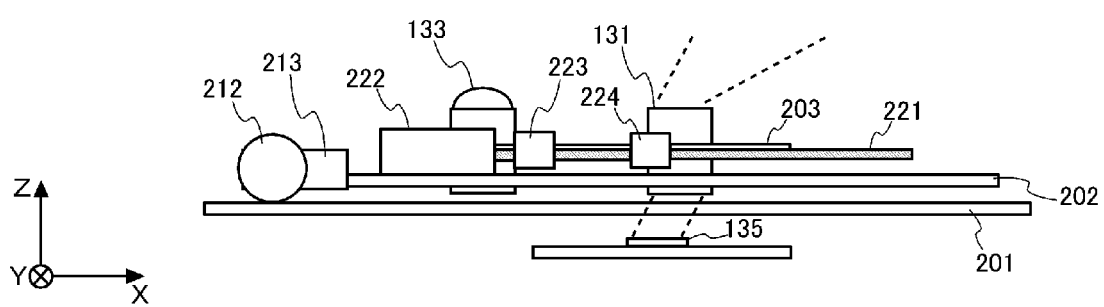
FIG. 9 shows the configuration of the imaging section.

FIGS. 6, 7, 8, and 9 show the configuration of the imaging section 130. FIG. 6 shows the imaging section 130 viewed in the direction perpendicular to the directions X and Y, and the first imaging lens 131 or the second imaging lens 133 is exposed via the front surface 103 of the enclosure 101 of the projector 100, as shown in FIG. 1. A transparent cover may be provided on the front side of the first imaging lens 131 or the second imaging lens 133. FIGS. 7 and 8 are side views of the imaging section 130 viewed in the direction Y. FIG. 9 shows a state in which the imaging lens shift action has shifted the lens position of the first imaging lens 131.

The imaging section 130 includes the imaging lens moving mechanism 137, as described above. The configuration of the imaging lens moving mechanism 137 will be described with reference to FIGS. 6 to 9.

The imaging lens moving mechanism 137 includes a base substrate 201, a direction-Y moving table 202, a direction-X moving table 203, a direction-Y moving mechanism 210, and a direction-X moving mechanism 220. The direction-Y moving table 202 and the direction-X moving table 203 correspond to an example of "a support that supports a first imaging lens and a second imaging lens." The direction-Y moving mechanism 210 and the direction-X moving mechanism 220 correspond to an example of "a moving mechanism."

The first imaging lens 131 and the second imaging lens 133 are mounted on the direction-X moving table 203. When the direction-X moving mechanism 220 moves the direction-X moving table 203 in the direction X, the first imaging lens 131 and the second imaging lens 133 move in the direction X in association with the direction-X moving table 203. The direction X corresponds to an example of "a direction that intersects an optical axis of an imaging section."

The direction-X moving table 203 and the direction-X moving mechanism 220 are mounted on the direction-Y moving table 202. When the direction-Y moving mechanism 210 moves the direction-Y moving table 202 in the direction Y, the direction-X moving table 203 also moves in the direction Y in association with the movement of the direction-Y moving table 202. The first imaging lens 131 and the second imaging lens 133 mounted on the direction-X moving table 203 thus move in the direction Y. The direction Y corresponds to an example of "a direction that intersects an optical axis of an imaging section."

The direction-Y moving mechanism 210 includes a direction-Y shaft 211, a direction-Y motor 212, a first bolt 213, and a second bolt 214.

The direction-Y shaft 211 has an end coupled to the direction-Y motor 212 and rotates in association with the rotation provided by the direction-Y motor 212. The direction-Y shaft 211 is supported by the first bolt 213 and the second bolt 214 formed at an end of the direction-Y moving table 202. A female screw is formed on the inner circumferential surface of each of the first bolt 213 and the second bolt 214, and a male screw that engages with the female screws of the first bolt 213 and the second bolt 214 is formed on the direction-Y shaft 211.

When the direction-Y motor 212 provides forward or reverse rotation, the direction-Y shaft 211 rotates, and the first bolt 213 and the second bolt 214, which engage with the direction-Y shaft 211, move in the direction +Y, which is the positive direction Y, or in the direction −Y, which is opposite the direction +Y. The direction-Y moving table 202 thus moves in the direction +Y or −Y.

The direction-X moving mechanism 220 includes a direction-X shaft 221, a direction-X motor 222, a third bolt 223, and a fourth bolt 224.

The direction-X shaft 221 has an end coupled to the direction-X motor 222 and rotates in association with the rotation provided by the direction-X motor 222. The direction-X shaft 221 is supported by the third bolt 223 and the fourth bolt 224 formed at an end of the direction-X moving table 203. A female screw is formed on the inner circumferential surface of each of the third bolt 223 and the fourth bolt 224, and a male screw that engages with the female screws of the third bolt 223 and the fourth bolt 224 is formed on the direction-X shaft 221.

When the direction-X motor 222 provides forward or reverse rotation, the direction-X shaft 221 rotates, and the third bolt 223 and the fourth bolt 224, which engage with the direction-X shaft 221, move in the direction +X, which is the positive direction X, or in the direction −X, which is opposite the direction +X. The direction-X moving table 203 thus moves in the direction +X or −X.

FIG. 7 shows the case where the first imaging lens 131 is located in the imaging position, and FIG. 8 shows the case where the second imaging lens 133 is located in the imaging position.

The control section 160 drives the direction-X motor 222 to perform the imaging lens switch action. When the direction-X motor 222 provides forward rotation, the direction-X moving table 203 moves in the direction +X, whereas when the direction-X motor 222 provides reverse rotation, the direction-X moving table 203 moves in the direction −X. The control section 160 causes the direction-X motor 222 to provide forward rotation to move the second imaging lens 133 to the imaging position and causes the direction-X motor 222 to provide reverse rotation to move the first imaging lens 131 to the imaging position.

The imaging section 130 can perform normal imaging and shifted imaging.

The normal imaging is performed in the state in which the optical axis of the first imaging lens 131 or the second imaging lens 133 located in the imaging position is perpendicular to the light reception surface of the imaging device 135 and the optical axis passes through the center of the imaging device 135.

The shifted imaging will next be described with reference to FIG. 9.

In the shifted imaging, the imaging section 130 performs imaging in the state in which the center of the imaging device 135 is located in a position shifted from the optical axis of the first imaging lens 131 or the second imaging lens 133 located in the imaging position. The control section 160 causes the imaging lens moving mechanism 137 to perform the imaging lens shift action and controls the imaging lens moving mechanism 137 in such a way that the optical axis of the first imaging lens 131 or the second imaging lens 133 is shifted from the center of the imaging device 135. The resultant tilting effect allows capture of an image of a range containing a range different from the imaging range IA in the normal imaging. A different range can be imaged by moving the imaging range IA with no change in the size itself of the imaging range IA.

Figure 10:
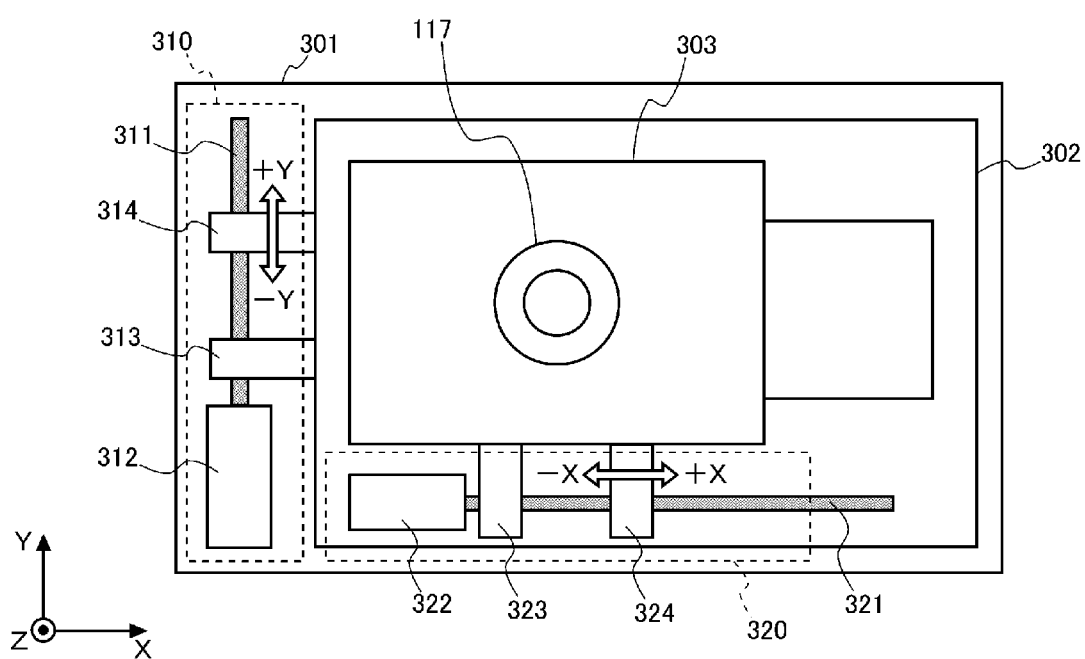
FIG. 10 shows the configuration of a projection section.

FIG. 10 shows the configuration of the projection section 110.

The configuration of the projection lens moving mechanism 119 provided in the projection section 110 will now be briefly described. The configuration of the projection lens moving mechanism 119 is substantially the same as the configuration of the imaging lens moving mechanism 137 shown in FIGS. 5 to 9, and the projection lens moving mechanism 119 includes a base substrate 301, a direction-Y moving table 302, a direction-X moving table 303, a direction-Y moving mechanism 310, and a direction-X moving mechanism 320.

The projection lens 117 is mounted on the direction-X moving table 303. The direction-X moving table 303 and the direction-X moving mechanism 320 are mounted on the direction-Y moving table 302. The direction-Y moving mechanism 310 includes a direction-Y shaft 311, a direction-Y motor 312, a fifth bolt 313, and a sixth bolt 314. The direction-X moving mechanism 320 includes a direction-X shaft 321, a direction-X motor 322, a seventh bolt 323, and an eighth bolt 324.

When the direction-Y motor 312 of the direction-Y moving mechanism 310 provides forward or reverse rotation, the direction-Y moving table 302 moves in the direction +Y or −Y in the projection lens moving mechanism 119. Similarly, when the direction-X motor 322 of the direction-X moving mechanism 320 provides forward or reverse rotation, the direction-X moving table 303 moves in the direction +X or −X in the projection lens moving mechanism 119. The projection lens shift action of adjusting the projection range of the projection lens 117 is thus achieved.

Referring back to FIG. 5, the description of the entire configuration of the projector 100 will be resumed.

The projector 100 includes an operation section 141. The operation section 141 functions as an acceptor that accepts a user's operation. The operation section 141 is, for example, an operation piece provided on the main body of the projector 100 and may be configured to receive an operation signal transmitted from a remote control and output a signal corresponding to the received operation signal to the control section 160.

The projector 100 includes a wireless communication section 143. The wireless communication section 143 wirelessly communicates with an external apparatus, including the projector 100, in accordance with a predetermined wireless communication standard. Employable examples of the predetermined wireless communication standard may include a wireless LAN, Bluetooth, UWB, and infrared communication. Bluetooth is a registered trademark.

The projector 100 includes an image input interface 151, the image processor 153, and a frame memory 155.

The image input interface 151 is an interface to which image data is inputted and includes a connector to which a cable is coupled and an interface circuit that receives the image data via the cable.

The image input interface 151 can couple an image supplier that supplies image data to the projector 100. The image data handled by the projector 100 may be motion image data or still image data and may be configured in an arbitrary data format.

The frame memory 155 is coupled to the image processor 153. The image processor 153 develops and processes the image data inputted via the image input interface 151 in the frame memory 155. Examples of processes carried out by the image processor 153 may include a shape distortion correction process of correcting distortion of the shape of a projection image and an OSD process of superimposing an OSD (on-screen display) image on a projection image. The image processor 153 may further carryout an image adjustment process of adjusting the luminance and tint of the image data and a resolution conversion process of adjusting the aspect ratio and resolution of the image data in accordance with those of the light modulator 113.

Having completed the image processing, the image processor 153 outputs the processed image data to the light modulator driving circuit 123. Based on the inputted image data, the light modulator driving circuit 123 produces a drive signal that drives the light modulator 113.

The projector 100 includes the control section 160, which controls each portion of the projector 100. The control section 160 may achieve the functions of the control section 160, for example, based on cooperation between hardware and software. The control section 160 may instead be formed of hardware having a programmed computation function. The present embodiment will be described with reference to a configuration in which the control section 160 includes a storage 161 and a processor 165 by way of example.

The storage 161 has a nonvolatile storage area that stores data in a nonvolatile manner. The nonvolatile storage area stores a control program 161a, image data 161b, and a parameter 161c. The control program 161a is a program, such as an OS and an application program executed by the processor 165.

The image data 161b is data based on which the image light PL to be projected by the projection section 110 on the screen SC is produced. The image data 161b contains, for example, image data 161b on a test pattern and image data 161b for color adjustment. The image data 161b on a test pattern is used to evaluate whether or not captured image data captured by the imaging section 130 contains a projection image displayed on the screen SC. The image data 161b on a test pattern contains, for example, a pattern image in which a plurality of circles are concentrically arranged. Analyzing the captured image data on the captured test pattern image allows evaluation of a test pattern portion that is not contained in the captured image data and the size of the test pattern image contained in the captured image data.

The image data 161b for color adjustment contains red, green, and blue single-color raster images and is prepared in the form of images expressed by a plurality of grayscales set in advance. The projector 100 projects images based on the image data 161b for color adjustment on the screen SC and causes the imaging section 130 to capture an image of the projected images to produce captured image data. The projector 100 then analyzes the captured image data to produce the parameter 161c used to adjust the hue of the entire projection image.

The parameter 161c is a parameter used in the image processing performed by the image processor 153. The storage 161 further has a volatile storage area that stores data in a volatile manner. The volatile storage area serves as a work area used by the processor 165.

The preprocess 165 is a computation device formed, for example, of a CPU or a microcomputer. The processor 165 may be formed of a single processor or a plurality of processors. The processor 165 may instead be formed of an SoC unit integrated with part or entirety of the storage 161 and other circuits. The processor 165 may still instead be formed of the combination of a CPU that executes a program and a DSP that performs predetermined computation. The processor 165 may still instead be formed of hardware that implements the entire functions of the processor 165 or a programmable device. The processor 165 may also function as the image processor 153. That is, the processor 165 may provide the function of the image processor 153.

The control section 160, specifically, the processor 165 executes instruction sets written in the control program 161a to perform data computation and control. The control section 160 thus functions as a projection controller 165a, an imaging controller 165b, and a correction controller 165c.

The projection controller 165a controls the projection section 110 to cause it to produce the image light PL based on the image data 161b and project the produced image light PL via the projection lens 117. Further, the projection controller 165a controls the projection lens moving mechanism 119 to cause the lens section 115 to perform the projection lens shift action.

The imaging controller 165b controls the imaging section 130 to cause it to perform imaging. Further, the imaging controller 165b controls the imaging lens moving mechanism 137 to cause the imaging section 130 to perform the imaging lens shift action and the imaging lens switch action.

The correction controller 165c reads the parameter 161c corresponding to image processing performed by the image processor 153 from the storage 161 and outputs the read parameter 161c to the image processor 153 to cause the image processor 153 to perform the image processing.

Figure 11:
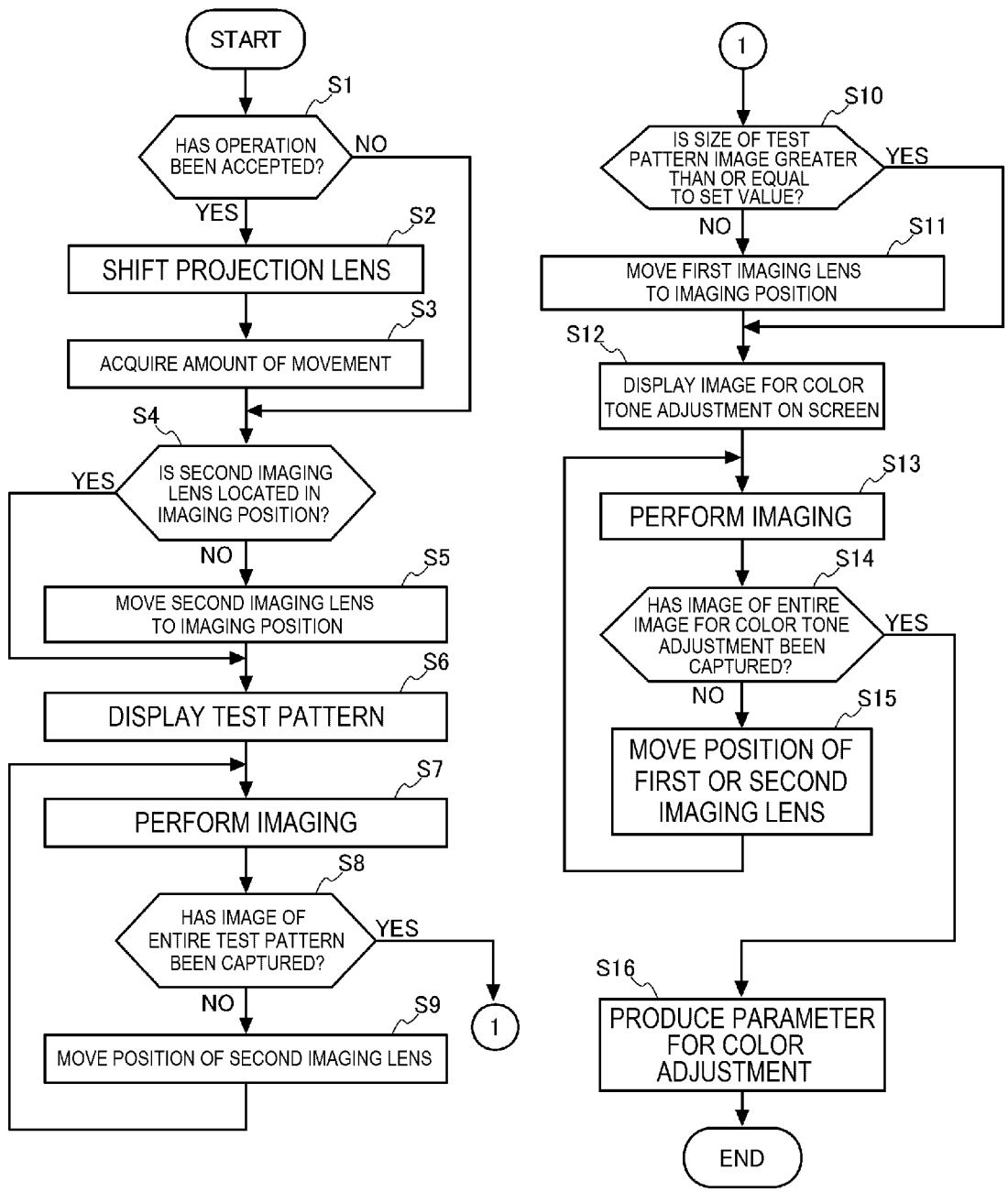
FIG. 11 is a flowchart showing the action of the projector.

FIG. 11 is a flowchart showing the action of the projector 100.

The action of the projector 100 will be described with reference to FIG. 11.

The control section 160 first evaluates whether or not the operation section 141 has accepted the user's operation (step S1). The user operates the operation section 141 to cause the test pattern image to be displayed in the area of the screen SC. In a case where the operation section 141 has accepted no operation (NO in step S1), the control section 160 proceeds to the evaluation in step S4.

In a case where the operation section 141 has accepted operation performed on the operation section 141 (YES in step S1), the control section 160 causes the projection lens moving mechanism 119 to perform the projection lens shift action in accordance with the accepted operation (step S2). The control section 160 calculates a movement direction in which the lens position of the projection lens 117 is moved and a movement distance over which the projection lens 117 is moved based on the operation accepted by the operation section 141. The control section 160 controls the projection lens moving mechanism 119 to move the projection lens 117 in the calculated movement direction by the calculated movement distance. The movement direction and the movement distance correspond to an example of "an amount of movement."

The control section 160 then acquires information on the movement direction in which and the movement distance by which the projection lens 117 has been moved as the amount of movement (step S3). Having acquired the amount of movement, the control section 160 determines based on the acquired amount of movement the movement direction in which and the movement distance by which the second imaging lens 133 is moved. That is, the control section 160 moves the first imaging lens 131 and the second imaging lens 133 in correspondence with the amount of movement of the projection lens 117.

The control section 160 then evaluates whether or not the second imaging lens 133 is located in the imaging position (step S4). In a case where the second imaging lens 133 is located in the imaging position (YES in step S4), the control section 160 proceeds to the action in step S6. In a case where the second imaging lens 133 is not located in the imaging position (NO in step S4), the control section 160 causes the imaging lens moving mechanism 137 to perform the imaging lens switch action to move the second imaging lens 133 to the imaging position (step S5).

The control section 160 then causes the projection section 110 to display the test pattern image on the screen SC (step S6). To this end, the control section 160 reads the image data 161b on the test pattern from the storage 161. The control section 160 causes the projection section 110 to produce the image light PL based on the read image data 161b and project the produced image light PL on the screen SC via the projection lens 117.

The control section 160 then causes the imaging section 130 to perform imaging (step S7). The imaging section 130 performs imaging to produce captured image data and outputs the produced captured image data to the control section 160. The control section 160 analyzes the captured image data to evaluate whether or not the captured image data contains the entire test pattern image (step S8). In a case where the captured image data contains the entire test pattern image (YES in step S8), the control section 160 proceeds to the evaluation in step S10.

In a case where the captured image data does not contain the entire test pattern image (NO in step S8), the control section 160 analyzes the test pattern image contained in the captured image data to determine the movement direction in which and the movement distance by which the second imaging lens 133 should be moved. The control section 160 identifies a side of the test pattern image that is the portion of the test pattern image not contained in the captured image data to determine the movement direction in which the second imaging lens 133 should be moved. Further, the control section 160 detects the size of the portion of the test pattern image that is not contained in the captured image data to determine the movement distance by which the second imaging lens 133 should be moved. The control section 160 then controls the imaging lens moving mechanism 137 to cause it to move the second imaging lens 133 in the calculated movement direction by the calculated movement distance (step S9). The control section 160 then causes the imaging section 130 to perform imaging again and evaluates whether or not the captured image data contains the entire test pattern image (step S8). The control section 160 repeats the process described above until the entire test pattern image is contained in the captured image data.

In the case where the captured image data contains the entire test pattern image (YES in step S8), the control section 160 evaluates whether or not the size of the test pattern image contained in the captured image data is greater than or equal to a preset size (step S10). In a case where the size of the test pattern image is greater than or equal to the preset size (YES in step S10), the control section 160 proceeds to the action in step S12.

In a case where the size of the test pattern image contained in the captured image data is smaller than the preset size (NO in step S10), the control section 160 controls the imaging lens moving mechanism 137 to move the first imaging lens 131 to the imaging position (step S11). That is, the first imaging lens 131, which has an angle of view smaller than that of the second imaging lens 133, is moved to the imaging position. In this process, in the state in which the first imaging lens 131 has been moved to the imaging position, the control section 160 may cause the projection section 110 to display the test pattern image on the screen SC and cause the imaging section 130 to perform imaging, as in steps S6 and S7. The control section 160 may then analyze the test pattern image contained in the captured image data and control the imaging lens moving mechanism 137 to move the first imaging lens 131.

The control section 160 then causes the projection section 110 to display an image for color adjustment on the screen SC (step S12). To this end, the control section 160 reads the image data 161b for color adjustment from the storage 161. The control section 160 causes the projection section 110 to produce the image light PL based on the read image data 161b and project the produced image light PL on the screen SC via the projection lens 117.

The control section 160 then causes the imaging section 130 to perform imaging (step S13). The imaging section 130 captures an image of the screen SC on which the image for color adjustment has been displayed to produce captured image data and outputs the produced captured image data to the control section 160. The control section 160 analyzes the captured image data to evaluate whether or not the captured image data contains the entire image for color tone adjustment (step S14).

In a case where the captured image data does not contain the entire image for color tone adjustment (NO in step S14), the control section 160 analyzes the image for color adjustment contained in the captured image data to determine the movement direction in which and the movement distance by which the first imaging lens 131 or the second imaging lens 133 should be moved. The control section 160 identifies a side of the image for color adjustment that is the portion of the image for color adjustment not contained in the captured image data to determine the movement direction in which the first imaging lens 131 or the second imaging lens 133 should be moved. Further, the control section 160 detects the size of the portion of the image for color adjustment that is not contained in the captured image data to determine the movement distance by which the first imaging lens 131 or the second imaging lens 133 should be moved. The control section 160 then controls the imaging lens moving mechanism 137 to cause it to move the first imaging lens 131 or the second imaging lens 133 in the calculated movement direction by the calculated movement distance (step S15). The control section 160 then causes the imaging section 130 to perform imaging again and evaluates whether or not the captured image data contains the entire image for color adjustment (step S14). The control section 160 repeats the process described above until the entire image for color adjustment is contained in the captured image data.

In a case where the captured image data contains the entire image for color adjustment (YES in step S14), the control section 160 produces, based on the captured image data containing the image for color adjustment, the parameter 161c used to adjust the color of the image (step S16). The control section 160 causes the storage 161 to store the produced parameter 161c.

As described above, in the projector 100 according to the present embodiment, the first imaging lens 131 and the second imaging lens 133 are moved in a direction that intersects the optical axis of the imaging section 130 to adjust the imaging range IA of the imaging section 130. Further, in the projector 100, the first imaging lens 131 and the second imaging lens 133 are moved in a direction that intersects the optical axis of the imaging section 130 to switch the first imaging lens 131 or the second imaging lens 133 located in the imaging position corresponding to the imaging section 130 to the other.

Moving the first imaging lens 131 and the second imaging lens 133 in a direction that intersects the optical axis of the imaging section 130 therefore readily allows switching of the imaging lens and adjustment of the imaging range IA of the switched imaging lens, whereby the convenience of the projector 100 can be improved.

Further, the projection lens 117 is moved in a direction that intersects the optical axis of the projection section 110 to adjust the direction in which the image light is projected. The amount of movement of the projection lens 117 is acquired, and the first imaging lens 131 or the second imaging lens 133 is moved in correspondence with the amount of movement of the projection lens 117.

The imaging range IA of the first imaging lens 131 or the second imaging lens 133 can therefore be so adjusted as to correspond to the adjusted projection direction of the projection lens 117.

The imaging lens moving mechanism 137 moves the first imaging lens 131 and the second imaging lens 133 to perform the imaging lens switch action and the imaging lens shift action. The imaging lens switch action is the action of switching the imaging lens located in the position corresponding to the imaging section 130 to the other, and the imaging lens shift action is the action of shifting the imaging lens in the position corresponding to the imaging section 130.

The imaging lens switch action and the imaging lens shift action can therefore be performed by causing the imaging lens moving mechanism 137 to move the first imaging lens 131 and the second imaging lens 133.

The projector 100 includes the projection section 110, the first imaging lens 131 and the second imaging lens 133 as a plurality of lenses, the imaging section 130, and the imaging lens moving mechanism 137. The projection section 110 projects the image light PL. The imaging section 130 performs imaging via one of the first imaging lens 131 and the second imaging lens 133.

The imaging lens moving mechanism 137 moves the first imaging lens 131 and the second imaging lens 133 in a direction that intersects the optical axes of the first imaging lens 131 and the second imaging lens 133.

Further, the imaging lens moving mechanism 137 can perform the imaging lens switch action of switching the imaging lens used by the imaging section 130 to perform imaging and the imaging lens shift action of shifting the imaging lens in the position corresponding to the imaging section 130.

The imaging lens switch action and the imaging lens shift action can therefore be readily performed, whereby the convenience of the projector 100 can be improved.

The imaging lens moving mechanism 137 moves the first imaging lens 131 and the second imaging lens 133 to the position corresponding to the imaging section 130 and the position that does not correspond to the imaging section 130.

The imaging lens switch action therefore allows the imaging lens used to perform imaging to be switched from one to the other.

The imaging lens moving mechanism 137 moves the first imaging lens 131 and the second imaging lens 133 along a plane that intersects the optical axes of the imaging lenses.

The imaging range IA of the imaging section 130 can therefore be adjusted by performing the imaging lens shift action.

The imaging lens moving mechanism 137 includes the direction-Y moving table 202 and the direction-X moving table 203 as the support that supports the first imaging lens 131 and the second imaging lens 133. The imaging lens moving mechanism 137 further includes the direction-Y moving mechanism 210, which moves the direction-Y moving table 202, and the direction-X moving mechanism 220, which moves the direction-X moving table 203.

In the imaging lens switch action, the imaging lens moving mechanism 137 moves the direction-Y moving table 202 and the direction-X moving table 203 to move one of the first imaging lens 131 and the second imaging lens 133 to the optical axis of the imaging section 130.

The imaging lens used by the imaging section 130 to perform imaging can therefore be switched from one to the other.

At least one of the first imaging lens 131 and the second imaging lens 133 is so disposed as to face in the direction in which the image light PL is projected.

An image of the screen SC on which the image light PL has been focused and an image has therefore been displayed can therefore be captured.

The projection section 110 includes the projection lens 117 and the projection lens moving mechanism 119, which moves the projection lens 117 in a direction that intersects the optical axis of the projection section 110.

The imaging lens moving mechanism 137 can perform the imaging lens shift action of shifting the first imaging lens 131 or the second imaging lens 133 in correspondence with the amount of movement over which the projection lens moving mechanism 119 moves the projection lens 117.

The imaging range IA of each of the first imaging lens 131 and the second imaging lens 133 can therefore be so adjusted as to correspond to the adjusted projection direction of the projection lens 117.

Second Embodiment

Figure 12:
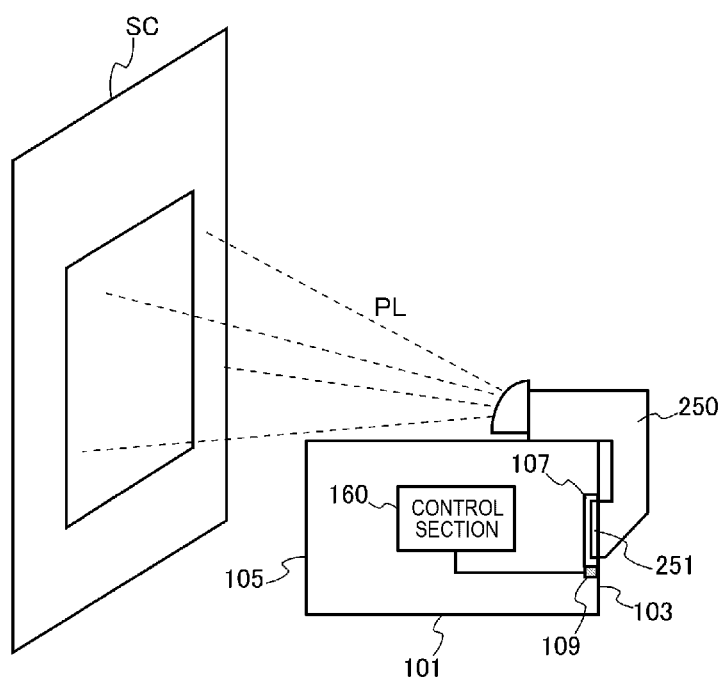
FIG. 12 shows the state in which a projector according to a second embodiment is used.
Figure 13:
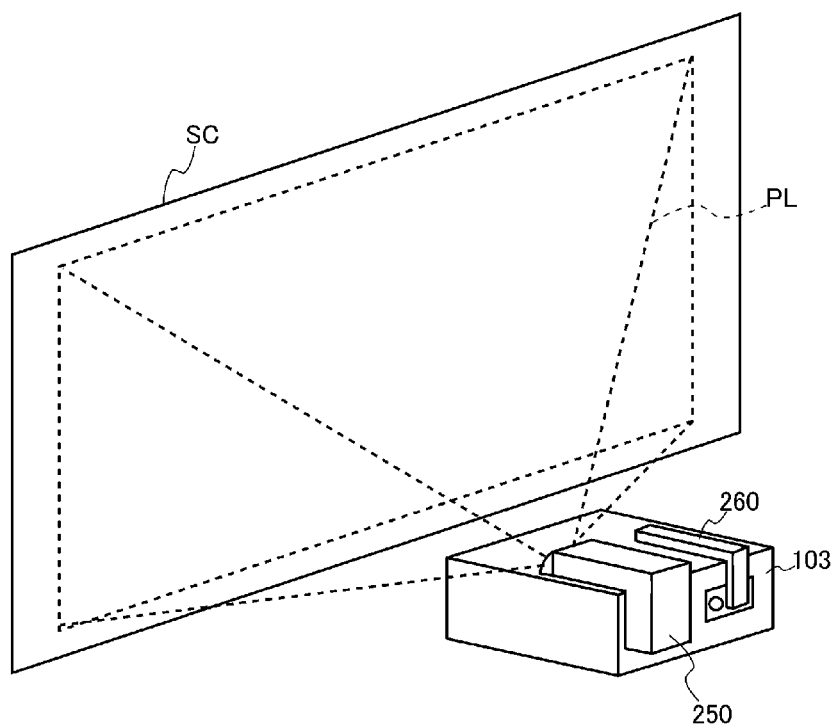
FIG. 13 shows the state in which the projector according to the second embodiment is used.

FIGS. 12 and 13 show a projector 100 according to a second embodiment.

The projector 100 according to the second embodiment is so configured that a projection direction changing system 250 is attachable to and detachable from the enclosure 101. The projection direction changing system 250 is an optical system that changes the direction in which the image light PL produced by the light modulator 113 is projected. In the case where the projection direction changing system 250 is attached to the projector 100, the projector 100 is so disposed that a rear surface 105 of the enclosure 101 faces the screen SC.

The projection direction changing system 250 is attached to the enclosure 101 by joining a mount section 251 of the projection direction changing system 250 to a mount section 107 of the enclosure 101. The mount sections 107 and 251 are joint portions provided on the enclosure 101 and the projection direction changing system 250, respectively. The mount section 107 of the projector 100 is provided with a mechanical switch 109, which detects that the projection direction changing system 250 has been attached. The mechanical switch 109 functions as a detector that detects that the projection direction changing system 250 has been attached, is turned on when the projection direction changing system 250 is attached, and outputs a signal to the control section 160.

A wide-angle lens is attached to the projection direction changing system 250. For example, in an environment in which the projector 100 can only be so installed as to be separate from the screen SC within a fixed distance, the projection direction changing system 250 is attached to the projector 100, and the projector 100 is so installed that the rear surface 105 faces the screen SC. A large-screen image can thus be displayed on the screen SC even in close-range projection in which the distance between the projector 100 and the screen SC is very small.

The projection direction changing system 250 changes the direction in which the image light PL is projected to the direction toward the rear surface 105, which is opposite the direction toward the front surface 103. The projection direction changing system 250 includes, for example, a plurality of lens groups that relay the light outputted from the light modulator 113, a plurality of optical elements that reverse the optical path of the light by 180°, and a wide-angle lens that projects the light whose optical path is reversed by 180° on the screen SC. The optical parts described above are not shown.

An imaging unit 260 is attached to the imaging section 130 of the projector 100. In the present embodiment, the imaging unit 260 is attached in place of the second imaging lens 133. Instead, the imaging section 130 may include the first imaging lens 131, the second imaging lens 133, and the third imaging unit 260.

In the case where the projector 100 is so installed that the rear surface 105 faces the screen SC, the imaging unit 260 is a unit for capturing an image of the screen SC. The imaging unit 260 includes a plurality of lens groups that relay light that enters the imaging unit 260, a plurality of optical elements that reverse the optical path of the light by 180°, an imaging lens that captures an image of the light whose optical path is reversed by 180° by the optical elements, and other components. The imaging lens is a lens that faces in the direction in which the image light PL traveling in the direction changed by the projection direction changing system 250 is projected.

In the case where the projection direction changing system 250 is attached, and when the mechanical switch 109 inputs the signal to the control section 160, the control section 160 causes the imaging lens moving mechanism 137 to perform the imaging lens switch action so that the third imaging unit 260 is moved to the imaging position. As a result, even when the projection direction changing system 250 is attached so that the direction in which the image light PL is projected is changed, the imaging section 130 can capture an image of a captured image displayed on the screen SC, which faces the rear surface 105 of the enclosure 101.

The first and second embodiments described above each show a specific example to which the present disclosure is applied, and the present disclosure is not limited thereto.

For example, the above first and second embodiments have been described with reference to the case where the light modulator 113 includes a transmissive light modulating device as the light modulating device. The light modulating device may instead be a reflective light modulating device or a digital mirror device. Still instead, the light modulating device may be the combination of a digital mirror device and a color wheel.

The functional portions of the projector 100 shown in FIG. 5 each represent a functional configuration and is not necessarily implemented in a specific form. That is, hardware corresponding to each of the functional portions is not necessarily implemented, and a single processor that executes a program can, of course, achieve the functions of the plurality of functional portions. Further, the functions of one or more of the functional portions can be achieved by a plurality of processors that cooperate with one another. Moreover, part of the functions achieved by software in the embodiments described above may be achieved by hardware, or part of the functions achieved by hardware may be achieved by software.

In a case where the method for controlling the projector is achieved by a computer incorporated in the projector 100, a program executed by the computer can be configured in the form of a recording medium or a transmission medium that transmits the program. The recording medium can be a magnetic or optical recording medium or a semiconductor memory device. Specific examples of the recording medium may include a flexible disk, an HDD (hard disk drive), a CD-ROM (compact disk read only memory), a DVD, a Blu-ray Disc, a magneto-optical disk, a flash memory, and a portable or immobile recording medium, such as a card-shaped recording medium. The recording medium described above may instead be a RAM (random access memory), a ROM (read only memory), an HDD, or any other nonvolatile storage device provided in the projector 100. Blu-ray is a registered trademark.

The process units in the flowcharts shown in FIG. 11 are process units divided in accordance with the contents of the primary processes for easy understanding of the processes carried out by the control section 160. How to produce the divided process units or the names of the process units shown in the flowchart of FIG. 11 therefore do not limit the present disclosure. A process carried out by the control section 160 can be further divided into a larger number of process units in accordance with the content of the process, and each of the process units can further be divided into a large number of processes. Further, the order in which the processes are carried out in the flowchart described above is not limited to that shown in FIG. 11.

What is claimed is:
1. A projector comprising:
a projection section that projects image light, wherein the projection section includes a projection lens and a projection lens moving mechanism that moves the projection lens in a direction that intersects an optical axis of the projection section;
a first imaging lens;
a second imaging lens;
an imaging section that captures an image of a displayed image formed of the projected image light via the first imaging lens or the second imaging lens; and
an imaging lens moving mechanism that moves the first imaging lens and the second imaging lens in a direction that intersects optical axes of the imaging lenses,
wherein the imaging lens moving mechanism performs a lens switch action of switching the first imaging lens or the second imaging lens used by the imaging section to perform the imaging from one to another and a lens shift action of shifting the first imaging lens or the second imaging lens in a position corresponding to the imaging section, and wherein the imaging lens moving mechanism is capable of performing the lens shift action of shifting the first imaging lens or the second imaging lens in correspondence with an amount of movement over which the projection lens moving mechanism moves the projection lens.

2. The projector according to claim 1, wherein the imaging lens moving mechanism moves the first imaging lens or the second imaging lens to the position that corresponds to the imaging section and a position that does not correspond to the imaging section.

3. The projector according to claim 1, wherein the imaging lens moving mechanism moves the first imaging lens and the second imaging lens along a plane that intersects the optical axes of the imaging lenses.

4. The projector according to claim 3, wherein the imaging lens moving mechanism includes a support that supports the first imaging lens and the second imaging lens and a moving mechanism that moves the support, and the moving mechanism moves the support in the lens switch action to move the first imaging lens or the second imaging lens to an optical axis of the imaging section.

5. The projector according to claim 1, wherein at least one of the first imaging lens and the second imaging lens is so disposed as to face in a direction in which the image light is projected.

6. The projector according to claim 1,
wherein a projection direction changing system is attachable to the projection section and allows the projection section to change a direction in which the image light is projected.

7. The projector according to claim 1, wherein the projection lens moving mechanism comprises motors, the motors comprising a direction-X motor to provide forward or reverse rotation along an X axis of the projection lens moving mechanism, and the motors comprising a direction-Y motor to provide forward or reverse rotation along a Y axis of the projection lens moving mechanism.

8. A method for controlling a projector, the method comprising:
moving, by an image lens moving mechanism, a first imaging lens and a second imaging lens in a direction that intersects an optical axis of an imaging section that captures an image of a displayed image to adjust an imaging range of the imaging section;
moving the first imaging lens and the second imaging lens in the direction that intersects the optical axis of the imaging section to switch the first imaging lens or the second imaging lens located in a position corresponding to the imaging section from one to another; and
moving, by a projection lens moving mechanism, a projection lens in a direction that intersects an optical axis of a projection section that projects the displayed image to adjust a direction in which image light is projected, acquiring an amount of movement of the projection lens, and moving the first imaging lens or the second imaging lens in correspondence with the amount of movement of the projection lens.

9. The method for controlling a projector according to claim 8, further comprising causing the imaging lens moving mechanism to perform a lens switch action of moving the first imaging lens and the second imaging lens to switch the first imaging lens or the second imaging lens located in a position corresponding to the imaging section from one to another and a lens shift action of shifting the first imaging lens or the second imaging lens in the position corresponding to the imaging section.

10. The method for controlling a projector according to claim 8, wherein the imaging lens moving mechanism moves the first imaging lens or the second imaging lens to the position that corresponds to the imaging section and a position that does not correspond to the imaging section.

11. The method for controlling a projector according to claim 8, wherein the imaging lens moving mechanism moves the first imaging lens and the second imaging lens along a plane that intersects the optical axes of the imaging lenses.

12. The method for controlling a projector according to claim 11, wherein the imaging lens moving mechanism includes a support that supports the first imaging lens and the second imaging lens and a moving mechanism that moves the support, and the imaging lens moving mechanism moves the support in a lens switch action to move the first imaging lens or the second imaging lens to an optical axis of the imaging section.

13. The method for controlling a projector according to claim 8, wherein at least one of the first imaging lens and the second imaging lens is so disposed as to face in a direction in which the image light is projected.

14. The method for controlling a projector according to claim 8, further comprising:
attaching a projection direction changing system that allows the projection section to change a direction in which the image light is projected.

15. The method for controlling a projector according to claim 8, wherein the projection lens moving mechanism comprises motors, the motors comprising a direction-X motor to provide forward or reverse rotation along an X axis of the projection lens moving mechanism, and the motors comprising a direction-Y motor to provide forward or reverse rotation along a Y axis of the projection lens moving mechanism.

* * * * *